US010321193B2

(12) United States Patent
Tang et al.

(10) Patent No.: US 10,321,193 B2
(45) Date of Patent: Jun. 11, 2019

(54) SHARING A USER-SELECTED VIDEO IN A GROUP COMMUNICATION

(71) Applicant: Google Inc., Mountain View, CA (US)

(72) Inventors: Annie Tang, San Francisco, CA (US); Benoît de Boursetty, Santa Monica, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

(21) Appl. No.: 15/694,246

(22) Filed: Sep. 1, 2017

(65) Prior Publication Data
US 2018/0070144 A1 Mar. 8, 2018

Related U.S. Application Data

(60) Provisional application No. 62/509,775, filed on May 23, 2017, provisional application No. 62/383,305, filed on Sep. 2, 2016.

(51) Int. Cl.
H04N 21/47 (2011.01)
H04N 21/478 (2011.01)
(Continued)

(52) U.S. Cl.
CPC ..... H04N 21/4788 (2013.01); G06F 16/7867 (2019.01); G06F 16/9535 (2019.01);
(Continued)

(58) Field of Classification Search
None
See application file for complete search history.

(56) References Cited

U.S. PATENT DOCUMENTS 8,909,740 B1    12/2014 Bliss et al.
9,229,938 B1*   1/2016 Jaini ................. G06F 17/30244
(Continued)

FOREIGN PATENT DOCUMENTS

CN    105 898 509 A    8/2016
EP    2 993 907 A1    3/2016
(Continued)

OTHER PUBLICATIONS

PCT International Search Report and Written Opinion for International Application No. PCT/US2017/049987, dated Dec. 4, 2017, 15 pages.

Primary Examiner — Ricky Chin
(74) Attorney, Agent, or Firm — Lowenstein Sandler LLP

(57) ABSTRACT

A processing device of a mobile device of a first user presents a graphical user interface (GUI) of an application providing group communication between the first user and one or more other users in a group, the GUI comprising a portion to receive a message of the first user for adding to the group communication, and a video sharing GUI element selectable by the first user to find a video to be added to the group communication. The processing device receives, via the GUI, a selection of the video sharing GUI element by the first user. Responsive to the selection of the video sharing GUI element, the processing device presents a plurality of video identifiers of videos having playback associated with the first user. Responsive to a selection of at least one of the plurality of video identifiers of at least one selected video, the processing device causes the at least one selected video to be added to the group communication.

19 Claims, 7 Drawing Sheets

(51) Int. Cl.
*H04N 21/4788* (2011.01)
*G06F 16/78* (2019.01)
*G06F 16/9535* (2019.01)
*H04N 21/232* (2011.01)
*H04N 21/414* (2011.01)
*H04N 21/472* (2011.01)
*H04N 21/2743* (2011.01)

(52) U.S. Cl.
CPC ....... *H04N 21/232* (2013.01); *H04N 21/2743* (2013.01); *H04N 21/41407* (2013.01); *H04N 21/47202* (2013.01)

(56) References Cited

U.S. PATENT DOCUMENTS

| | | |
|---|---|---|
| 2009/0320050 A1 | 12/2009 | Pousti et al. |
| 2010/0299522 A1* | 11/2010 | Khambete ............ H04L 63/061 713/168 |
| 2011/0110275 A1 | 5/2011 | Shaheen |
| 2011/0239253 A1* | 9/2011 | West ............. H04N 21/234363 725/46 |
| 2011/0289530 A1* | 11/2011 | Dureau ............. H04N 21/4622 725/38 |
| 2012/0215903 A1 | 8/2012 | Fleischman et al. |
| 2013/0018960 A1 | 1/2013 | Knysz et al. |
| 2013/0218885 A1 | 8/2013 | Satyanarayanan |
| 2013/0246522 A1* | 9/2013 | Bilinski ............. H04N 21/4758 709/204 |
| 2013/0282514 A1 | 10/2013 | Dougherty et al. |
| 2013/0311457 A1 | 11/2013 | Svendsen et al. |
| 2014/0214920 A1 | 7/2014 | Wong et al. |
| 2014/0215509 A1* | 7/2014 | Angiolillo ......... H04N 21/4113 725/25 |
| 2014/0223099 A1* | 8/2014 | Kidron ................ G06F 12/0806 711/118 |
| 2014/0237587 A1 | 8/2014 | Forbes et al. |
| 2014/0363141 A1 | 12/2014 | Bonhomme et al. |
| 2014/0372168 A1 | 12/2014 | Markham |
| 2015/0067601 A1 | 3/2015 | Bernstein et al. |
| 2015/0081904 A1* | 3/2015 | Guedalia ................ H04L 41/28 709/225 |
| 2015/0177937 A1 | 6/2015 | Poletto et al. |
| 2015/0181301 A1* | 6/2015 | Bloch ............. H04N 21/47217 725/41 |
| 2015/0382039 A1 | 12/2015 | Lewis et al. |
| 2017/0026703 A1* | 1/2017 | Phadnis ................ G06Q 30/02 |

FOREIGN PATENT DOCUMENTS

| | | |
|---|---|---|
| WO | 2015131922 A1 | 9/2014 |
| WO | 2014178461 A1 | 11/2014 |
| WO | 2017088409 A1 | 6/2017 |

* cited by examiner

US 10,321,193 B2

SHARING A USER-SELECTED VIDEO IN A GROUP COMMUNICATION

CROSS-REFERENCE TO RELATED APPLICATIONS

This application claims the benefit of priority from U.S. Provisional Application No. 62/509,775, filed on May 23, 2017, and U.S. Provisional Application No. 62/383,305, filed Sep. 2, 2016, which are herein incorporated by reference.

TECHNICAL FIELD

The present disclosure relates to user-to-user communication services, such as group messaging or commenting, and in particular, to creating a direct entry point for insertion of a user-selected video for distribution to members of a group communication.

BACKGROUND

A group communication on a content sharing service provides a forum for a user to share messages and videos with other participants. Often, a user may wish to share to the group communication a video that the user recently watched, shared, or liked on the content sharing service. However, in current content sharing services, in order to share such a video to the group communication, the user should first search for the video, then select the video for sharing, and then request that the selected video be added to the group communication. This can be a technically challenging, cumbersome and time-intensive process that may discourage users from sharing and decrease the total number of videos shared and viewed on the content sharing service.

SUMMARY

Aspects and implementations of the present disclosure improve user-to-user communication, such as group messaging or commenting, by providing a direct entry point within a group communication that allows a user to select and share videos from the user's consumption history. In some implementations, a server receives, from a first client device associated with a first user participating in a group communication with client devices of other users of a content sharing service an indication of a request of the first user to find a video to be added to the group communication. In response, the server determines, based on consumption history data of the first user, a plurality of video identifiers of videos having playback associated with the first user, and sends the plurality of video identifiers to the first client device. The server then receives, from the first client device, user input comprising a selection of at least one video identifier of at least one selected video, and an indication of adding the at least one selected video to the group communication. Further, the server causes the at least one selected video to be shared with the other users in the group communication, which can allow the other users to play the shared video on their devices.

In some implementations, a mobile device of a first user presents a graphical user interface (GUI) of an application providing group communication between the first user and one or more other users in a group. The GUI comprises a portion to receive a message of the first user for adding to the group communication, and a video sharing GUI element selectable by the first user to find a video to be added to the group communication. The mobile device can receive, via the GUI, a selection of the video sharing GUI element by the first user, and in response, present a plurality of video identifiers of videos having playback associated with the first user. Further, responsive to a selection of at least one of the plurality of video identifiers of at least one selected video, the mobile device can cause the at least one selected video to be added to the group communication.

BRIEF DESCRIPTION OF THE DRAWINGS

The disclosed embodiments have other advantages and features that will be more readily apparent from the detailed description and the accompanying figures. A brief introduction of the figures is below.

DETAILED DESCRIPTION

The present disclosure relates to user-to-user group communication, such as group messaging or commenting. Currently, in order to add a video to group communication, a user should first search for the video, then select a particular video, and then request that the selected video be shared with other users of the group communication. This can be a technically challenging, cumbersome and time-intensive process (especially for mobile device users) that may discourage users from sharing videos when participating in group communication.

Aspects of the present disclosure address the above and other deficiencies by creating a direct entry point for insertion of a user-selected video for distribution to members of a group communication. In some implementations, in order to enable users of a content sharing service to select and share videos having playback associated with the user, the content sharing service displays identifiers of videos from the user's consumption history to the user through a content sharing application. Responsive to receiving user input including a selection of one or more of the videos for adding to a group communication, the content sharing service transmits to a client device associated with the user an identifier of the one or more selected videos, and, responsive to receiving user input including an instruction to share the one or more selected videos, sends the identifier of the one or more selected videos to the client devices of the other users in the group communication.

As a result, the process of sharing a video with participants of group communication is simplified by replacing search operations with a selection operation. This is especially advantageous for mobile device environments, where performing a searching query no longer requires opening a different mobile application or providing multiple inputs to switch between different screens of a mobile application, and where entering a search query is no longer required, thereby replacing a conventional process that is inconvenient and time-consuming due to a limited screen size and a small keyboard.

Figure 1:
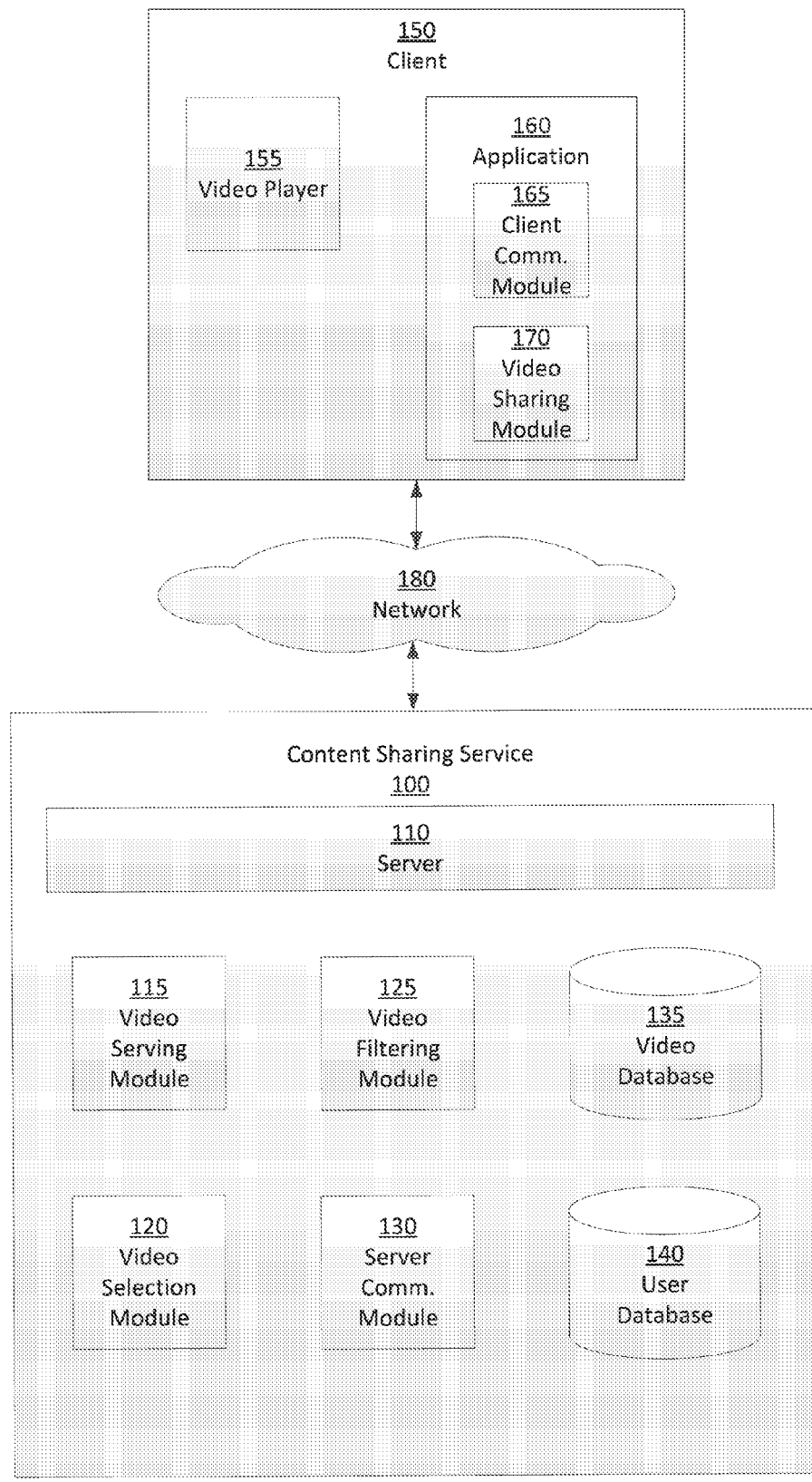
FIG. 1 is a block diagram illustrating a system architecture for insertion of a user-selected video in a group communication, according to an embodiment.

FIG. 1 is a block diagram illustrating a system architecture of an embodiment of a content sharing service 100. Examples of content sharing services are video services, social messaging services, multi-media messaging services, gaming services, music sharing services, and photo sharing services. The system is scalable to accommodate multiple users that use clients 150 to interact with the content sharing service 100. While only one client 150 is shown, it is understood that very large numbers (e.g., millions) of clients 150 are supported and can be in communication with the content sharing service 100 at any time.

The client 150 includes the content sharing application 160 downloaded through the network 180, which is typically the Internet, but can also be any network, including but not limited to any combination of a local area network (LAN), a metropolitan area network (MAN), a wide area network (WAN), a mobile, wired, or wireless network, a private network, or a virtual private network. In another embodiment, the content sharing application 160 is pre-loaded on the client 150 such that the user of the client 150 need not download the content sharing application 160. The client 150 uses the content sharing application 160 to interact with digital content items (e.g., video files, audio files, photos, etc.) and can connect to the server 110 of the content sharing service 100 via the network 180. The client 150 may include a variety of different computing devices. Examples of clients 150 can include personal computers, digital assistants, personal digital assistants, cellular phones, mobile phones, smart phones, laptop computers, etc.

Examples of content sharing application 160 are video sharing applications, social messaging applications, multimedia applications, gaming applications, and music sharing applications, and photo sharing applications. The content sharing application 160 allows for group communication and can include a client communication module 165 and a video sharing module 170. Group communication refers to exchange of messages between multiple members of a group, where the messages are included in a thread (e.g., a chronological stream of posts) visible to the members of the group, and can be, for example, part of a public or private group chat or a public or private comment thread. The messages may include different types of content, including, for example, textual content, images, audio and/or video content, etc. The client communication module 165 allows the user of the client 150 to participate in group communications through the content sharing application 160 by transmitting messages from the user to other users in the group communication and receiving messages from the other users in the group communication. Examples of technologies for implementing the group communication can include Short Message Service (SMS), Enhanced Message Service (EMS), Multimedia Message Service (MMS), instant messaging, social messaging, and email.

The video sharing module 170 facilitates video sharing in the group communication by transmitting video identifiers of videos selected by one or more users to other users of the group communication and receiving video identifiers of videos shared by other users of the group communication. In some embodiments, the video identifiers comprise sound files, images, and/or other kinds of media, or Uniform Resource Locators (URLs) or Uniform Resource Identifiers (URIs) that point to the locations of such media.

The client 150 also includes a video player 155 that is used for playing a video stream. The video player 155 can be a standalone application, or a plug-in to another application such as a network browser. In one embodiment, the video player 155 is embedded in the content sharing application 160. The video player 155 includes a user interface (UI) and UI controls (and corresponding application programming interfaces) for performing actions pertaining to a video, such as, selecting a video, controlling playback of a video (e.g., starting, stopping, pausing, forwarding, and rewinding a video), evaluating a video, sharing a video, commenting on a video. The video player 155 can include in its user interface a video display format selection configured to indicate the applicable video display format (e.g., a two-dimensional (2D) video or a three-dimensional (3D) video). Other types of user interface controls (e.g., buttons, keyboard controls) can be used as well to control the playback and video format selection functionality of the video player 155.

The content sharing service 100 can be a web server that hosts and/or serves video content items. Alternatively, the content sharing service 100 can be a server for mobile applications ("apps"), a gaming system server, or the like. Specific examples below that describe the content sharing service 100 in a particular implementation such as a web server are not intended to limit the scope of the described disclosure to that particular embodiment, but rather to provide examples and context for the associated description.

As shown in FIG. 1, the content sharing service (also referred to herein as a content sharing platform) 100 can include a server 110, a video serving module 115, a video selection module 120, a video filtering module 125, a server communication module 130, a video data store (e.g., video database) 135, and a user database 140. In one embodiment, the server communication module 130 is independent of the content sharing service 100. Additionally or alternatively, the server communication module 130 communicates with a third party messaging platform, such as a messaging application on a smartphone. In still other embodiments, the video serving module 115, the video selection module 120, the video filtering module 125, the server communication module 130, the video database 135, and the user database 140 are part of the server 110.

Many additional features, such as firewalls, load balancers, application servers, failover servers, site management tools and so forth are not shown so as not to obscure the features of the system. It will be understood that the term "website" represents any computer system adapted to serve content using any internetworking protocols, and is not intended to be limited to content uploaded or downloaded via the Internet or the HyperText Transfer Protocol (HTTP). In general, functions described in one embodiment as being performed on the server side can also be performed on the client side in other embodiments if appropriate. In addition, the functionality attributed to a particular component can be performed by different or multiple components operating together.

A server as referred to herein can be implemented as a server program executing on a server-class computer comprising a central processing unit (CPU), memory, network interface, peripheral interfaces, and other well-known components. The computers themselves preferably run an operating system such as LINUX, have generally high performance CPUs, several gigabytes of memory, and gigabytes, terabytes, or even petabytes of disk storage. Of course, other types of computers can be used, and it is expected that as more powerful computers are developed in the future, they can be configured in accordance with the teachings here. The functionality implemented by any of the elements can be provided from computer program products that are stored in tangible computer readable storage media (random access memory (RAM), hard disk, optical/magnetic media, etc.).

As previously described, a user of the client 150 uses the content sharing application 160 to connect to the server 110 to play videos and interact with other content items (e.g., audio files, images, etc.) that have been provided by content providers. Users of the client 150 can search for videos based on keywords or other metadata. These requests are received as queries by the server 110 and provided to the video serving module 115, which is responsible for searching the video data store (e.g., database 135) for videos that satisfy the user queries, and providing the videos to the users. The video serving module 115 supports searching on any characteristics of a video, including its title, description, metadata, author, category, and so forth. Alternatively, users can browse videos based on categories such as most viewed videos, sports, animals, or automobiles. For example, the user can browse videos related to cars and select which videos to watch. In some embodiments, the user can search for or browse suggested or trending videos, as determined by the content sharing service 100. Users can also access videos via autoplay or by clicking an advertisement displayed on the user interface of the content sharing service 100. Other methods for searching for and locating videos via video serving module 115 may also be employed at the discretion of the implementer.

The video selection module 120 allows a user using the client 150 to share a video with other users in a group communication. The video selection module 120 provides a direct entry point for the content sharing application 160 within the communication that allows a user to select and share a video with other users directly, without having to leave the content sharing application 160 or without having to provide multiple input to switch between different screens of an application. In some embodiments, this direct entry point includes a video selection control (also referred to herein as a video sharing GUI element) in the group communication interface, selection of which causes the content sharing application 160 to display a video selection interface.

Responsive to a user in a group communication selecting the video selection control such as an icon or button displayed in the user interface of the group communication, the client communication module 165 sends an instruction to the video selection module 120 to retrieve video identifier(s) of video(s) having playback associated with the user to display on the client 150. In one embodiment, videos having playback associated with the user include videos in the user's consumption history. Videos in the user's consumption history include videos that the user has watched on the content sharing service 100, as well as videos that the user has liked, shared, or commented on. In some embodiments, the consumption history data includes times of consumption of videos and/or frequency data indicating, for example, the number of times that a user has watched a video and/or the number of times that the user has commented on or shared the video.

In one embodiment, the user's consumption history is stored in the user database 140 and updated in response to the user taking an action associated with a content item (e.g., commenting on a video, sharing a video identifier) on the content sharing service 100. In one embodiment, the video selection module 120 queries the user database 140 for the user's consumption history data responsive to the instruction from the client communication module 165. Additionally or alternatively, the video selection module 120 queries the video database 135 for videos that are suggested or trending, as determined by the content sharing service 100.

The user's consumption history data from the user database 140 is provided to the video filtering module 125, which filters the videos before sending them to the video selection module 120 for display to the user through the video sharing module 170 of the content sharing application 160. Additionally or alternatively, the video database 135 sends identifiers of the suggested or trending videos to the video filtering module 125 for filtering. The video filtering module 125 applies filtering criteria including, for example, whether the video has already been shared to the group communication and whether the participants in the group communication have permission to access the video. Videos that are filtered out by the video filtering module 125 can include pre-roll advertisements and videos that are not shareable by the user (i.e., none of the participants in the group communication have permission to access the videos). For example, a user's consumption history might contain a private video to which the user has access, but to which other users in group communication do not. The video filtering module 125 queries the server communication module 130 for the permission settings associated with the user who caused the video to be uploaded to the content sharing service 100. In another embodiment, the video filtering module 125 queries the server communication module 130 for the permission settings associated with the users participating in the group chat. Responsive to determining that none of the participants in the group communication (other than the user) have permission to access the private video, the video filtering module 125 notifies the user via the content sharing application 160 that the user is blocked from sharing the private video to the group communication. If, however, the video filtering module 125 determines that some of the participants in the group communication have permission to access the private video, the video filtering module 125 notifies the user that the private video will be shared only with those participants who have permission to access the video and asking the user whether the user wishes to proceed with sharing the video with those participants.

The video filtering module 125 also queries the server communication module 130 for the group communication history and filters out videos that have already been shared in the context. In some embodiments, the video filtering module 125 filters out videos that have been shared within a specified time period (e.g., within the last hour, within the last day, within the last week, etc.). In other embodiments, the video filtering module 125 filters out videos that have been shared to the group communication regardless of when the video was previously shared.

To determine whether a video has already been shared to the group communication, the server communication module 130 searches the group communication history for video identifiers associated with videos stored in the video database 135. If the server communication module 130 locates a video identifier for a received video in the group communication history, the server communication module 130 determines that the video has already been shared to the group communication and removes the video from the received videos such that the video is not displayed to the user and therefore cannot be shared again in the group communication.

Once the video selection module 120 receives the filtered videos from the video filtering module 125, the video selection module 120 generates thumbnails representing each video, e.g., in list format, for presentation on a video selection interface and provides the thumbnails to the video sharing module 170 for review and selection by the user. In some embodiments, the list includes all videos responsive to the video parameters (i.e., all videos in the user's consumption history that were not filtered out by the video filtering module 125). In other embodiments, the list includes a maximum number of videos determined by the content sharing service 100 or the user. For example, the user can specify that he or she only wishes to include the ten most recently watched videos. Alternatively, the content sharing service 100 can set the maximum number of video thumbnails displayed in the list. In either embodiment, if the video that the user wishes to share is not included in the list of thumbnails, the content sharing service 100 gives the user the option to increase the maximum number of videos displayed and/or to search for the video. In some embodiments, the video selection interface includes a search box that allows the user to search for a video that is not included in the thumbnails displayed on the video selection page. Responsive to the user inputting search parameters into the search box, the video serving module 115 identifies search suggestions and search results for display by the client on the video selection interface.

When the user selects a video from the video selection interface, the video sharing module 170 displays a draft message including an identifier of the selected video and offering the user an option to add to the message. The identifier of the selected video that is included in the draft message can be the same video identifier (e.g., a thumbnail) that was displayed to the user for selection (e.g., in the thumbnail list). Alternatively, the identifier of the selected video that is included in the draft message can be in a different format than the video identifier (e.g., a thumbnail) that was displayed to the user prior to the selection (e.g., in the thumbnail list), and can be, for example, in the form of a playable thumbnail (as opposed to a static image thumbnail), a minimized video, a video preview, etc. Such an identifier that has a different format than video identifiers displayed prior to the user selection is referred to herein as a distribution identifier.

When the user activates the send button of the content sharing application 160, the video sharing module 170 transmits the identifier (e.g., the video identifier or the distribution identifier) of the selected video along with the message to the client devices 150 of the users in the group communication. The client devices 150 associated with the users in the group communication can use the received identifier to request the selected video from the video database 135. In one embodiment, the user selects two or more videos from the video selection interface.

The server communication module 130 provides the group communication for display on the client device 150 and monitors permission settings for each member of the group communication. For example, assume that a user of the content sharing service 100 caused a video to be uploaded to the content sharing service 100 and set privacy settings for the video to limit access to the uploaded video to other users of the content sharing service 100 who are connected to the posting user. If the posting user or another user connected to the posting user shared the video to a group communication, members of the group communication who are not connected to the posting user will not be able to view the video. In one embodiment, permission settings for users of the content sharing service 100 are stored in the user database 140.

In some implementations, responsive to determining that a user of the group communication does not have access to a video previously shared in the group communication, the server communication module 130 replaces the shared video with a placeholder image on the client devices associated with those users who do not have access to it. For example, a user might join a group communication in which other users have already shared videos and have access to the entire conversation. While the other users in the group communication had permission to access the previously shared videos, the new user might not. If the new user does not have permission to access a previously shared video, the server communication module 130 replaces the shared video with a placeholder image for the user.

In another embodiment, the server communication module 130 notifies a posting user whether the other users in the group communication have permission to access the video before the video is shared to the group communication. For example, assume that there are four users in a group communication and that user A wishes to share a video that he or she has permission to access. Responsive to user A selecting a video to share to the group communication, the server communication module 130 notifies the user through the content sharing application 160 that user B has permission to access the video and that users C and D do not have permission to access the video. In some embodiments, the server communication module 130 displays thumbnails representing videos from user A's consumption history that all members of the group communication have permission to access.

In some embodiments, the server communication module 130 sends a message to the content owner associated with the video requesting that the content owner expand the permissions to allow the new user to access the video. If the content owner grants the new user permission to access the video, the server communication module 130 does not replace the video with a placeholder image.

The video database 135 stores video files and associated metadata provided by content owners. Each uploaded video is assigned a video identifier (ID) when it is processed. In addition to the video ID, the video files have associated metadata such as artist, video title, label, genre, time length, and geo-restrictions that can be used for data collection or content blocking on a geographic basis. More or fewer items of metadata can be associated with video files at the discretion of the implementer. In some embodiments, the video database 135 also stores identifiers of suggested or trending videos, as determined by the content sharing service 100.

The user database 140 maintains a record of registered users of the content sharing service 100. Registered users include content providers and/or users that consume (e.g., play) and interact (e.g., share, rate, comment, etc.) with videos on the content sharing service 100, rather than upload videos to the content sharing service 100. A user can register account and/or credential information, including, for example, login name, e-mail address, and password with the content sharing service 100. This account and/or credential information is stored in the user database 140. The user database 140 also stores, for each registered user of the content sharing service 100, permission settings indicating content items or categories of content items that the user does and does not have permission to access.

For each registered user of the content sharing service 100, the user database 140 also stores consumption history data. A user's consumption history data includes identifiers of videos that the user watched on the content sharing service 100, as well as videos that the user has liked, shared, or commented on. In some embodiments, the consumption history data includes frequency data indicating, for example, the number of times that the user has watched a video and/or the number of times that the user has commented on or shared the video.

In one embodiment, the consumption history data includes identifiers of videos that the user has watched to completion. In other embodiments, the consumption history data includes identifiers of videos that the user watched for a specified period of time or to a specified percentage of completion.

In situations in which the systems discussed herein collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from a content server that may be more relevant to the user. In addition, certain data may be treated in one or more ways before it is stored or used, so that personally identifiable information is removed. For example, a user's identity may be treated so that no personally identifiable information can be determined for the user, or the user's geographic location may be generalized where location information is obtained (such as to a city, zip code, or state level), so that a particular location of a user cannot be determined. Thus, the user may have control over how information is collected about the user and used by a content server.

Figure 2:
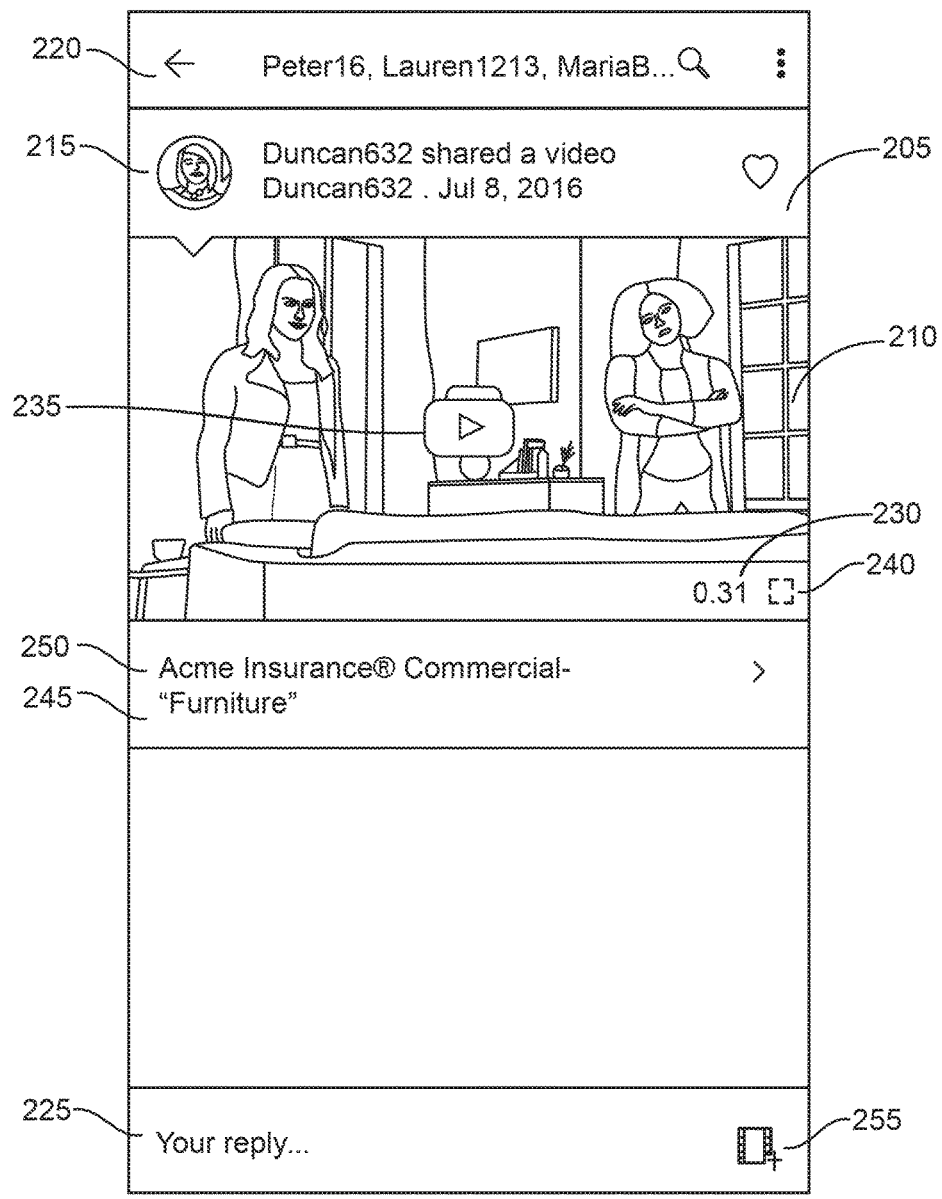
FIG. 2 illustrates an example group communication interface in which a video is shared, according to an embodiment.

FIG. 2 illustrates an example of a group communication interface 205 in which a video is shared in the group communication, according to some implementations. Other users in the group communication can play the video, write a reply to the video, or select another video for sharing in the group communication.

The group communication interface includes the shared video 210, a notification 215 that a user in the group communication shared the video, a display bar 220 showing identifiers of at least some of the members of the group communication, and a message box 225 allowing the user to reply to the shared video. For example, in FIG. 2, a user "Duncan632" has shared a video to the group communication containing users identified as "Peter16," "Lauren1213," and "MariaB." While the identifiers of only three other users participating in the group communication are displayed on the group communication interface, the group communication can contain very large numbers of users of the content sharing service. Below the display bar is a notification that user "Duncan632" has shared a video to the group communication as well as the user's name and the date that the user shared the video.

In the example in FIG. 2, a frame from the shared video is displayed and is overlaid by user interface (UI) elements indicating the total time of the video 230 and giving the user the option to begin playback 235 or expand the video into full screen mode 240. The UI can include metadata, such as the title 245 and content provider 250 of the video as well as the message box 225 allowing the user to prepare a message.

The group communication interface includes a video sharing GUI element (e.g., video selection icon) 255, for example, in the message box. Responsive to a user selecting the video sharing GUI element 255, the client communication module 165 sends an instruction to the video selection module 120 to retrieve a video identifier(s) of video(s) having playback associated with the user to display on the client 150, as discussed above.

Figure 3:
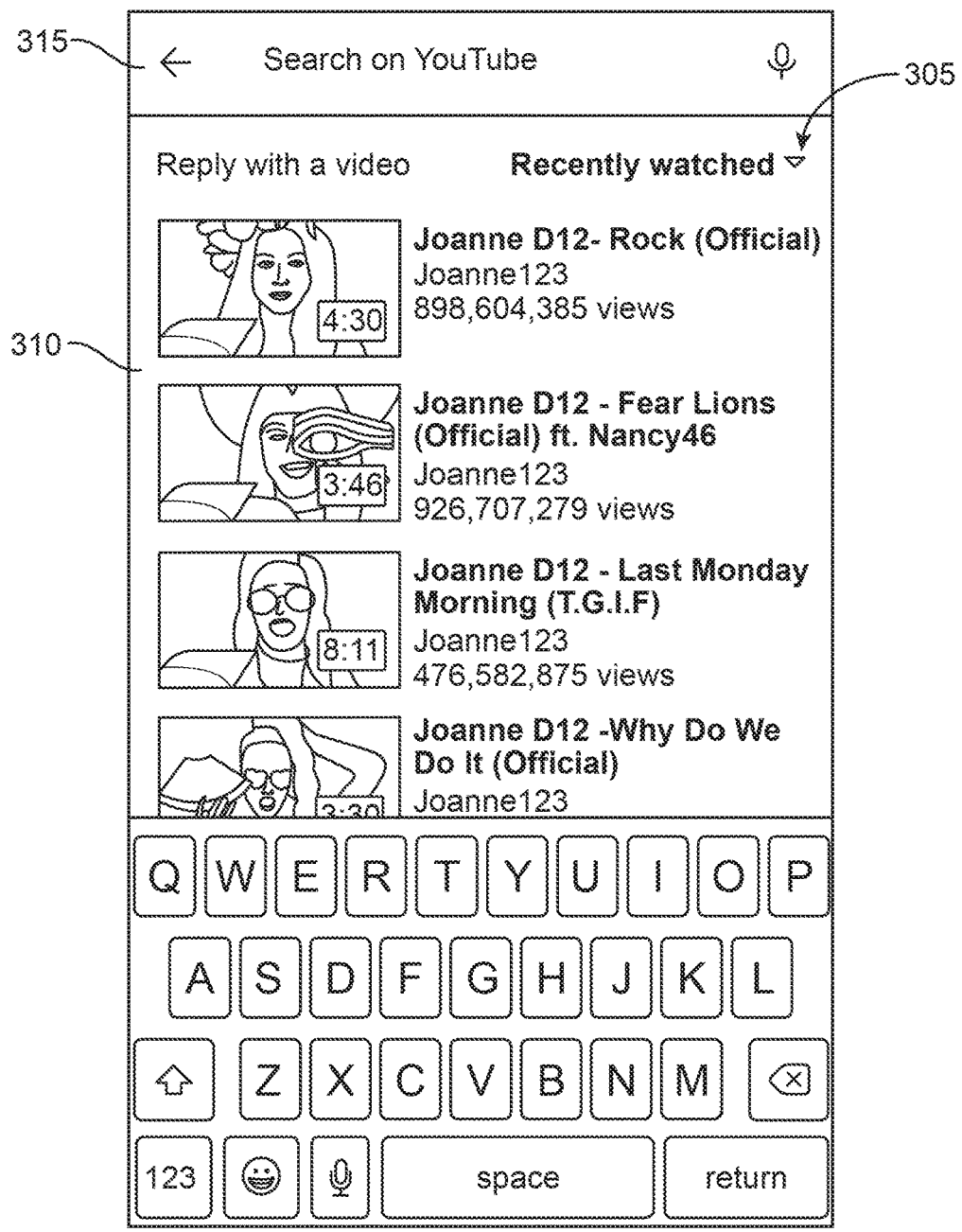
FIG. 3 illustrates an example video selection interface, according to an embodiment.

FIG. 3 illustrates an example video selection interface, according to some embodiments. The video selection interface includes a drop-down menu 305 allowing the user to select from among a plurality of video identifiers 310 of recently watched videos (e.g., videos recently watched by the viewing user), suggested videos (e.g., recommended videos not previously watched by the viewing user), or trending videos (e.g., popular videos not recently watched by the viewing user), as determined by the content sharing service 100. In FIG. 3, the video selection interface displays identifiers of the user's recently watched videos. In one implementation, before being displayed on the video selection interface the videos were filtered by the video filtering module 125, such that the displayed identifiers include only videos that are shareable by the user (i.e., videos that at least some participants in the group communication have permission to access), and that have not already been shared in the group communication. The video selection interface also includes a search box 315, allowing the user to search for a video that is not included in the thumbnails displayed in the video selection GUI to share in the group communication.

As shown in FIGS. 2 and 3, aspects of the present disclosure provide a mechanism for replying to an existing group communication with a video from a user's watch history via a video selection operation. The aspects of the present disclosure can be implemented within a native group communication (e.g., group chat) component of an application such as the content sharing application 160, a social networking application, etc. Alternatively, the aspects of the present disclosure can be implemented within an independent group communication (e.g., group chat) application.

Aspects of the present disclosure provide a video sharing GUI element (e.g., an icon or a button) 255 that is provided in a portion 225 of a group communication GUI (e.g., in a reply box presented with the message thread) of FIG. 2. A user selection of the video sharing GUI element 255 leads into a video selection GUI of FIG. 3, where a user can search for a video using a search input area 315, or choose a video from their watch history. Aspects of the present disclosure reuse the zero-query state of the search box 310 by showing identifiers of videos from the user's watch history instead of using the space 310 to show search query suggestions or no information. In some implementations, as soon as the user starts a search operation (e.g., if the user is not satisfied with the videos from the user's watch history), search suggestions/search results are presented in the search box 310 instead of (or in addition to the identifiers of the videos from the user's watch history), thereby not requiring any extra screen space for displaying identifiers of videos from the user's watch history.

Figure 4A:
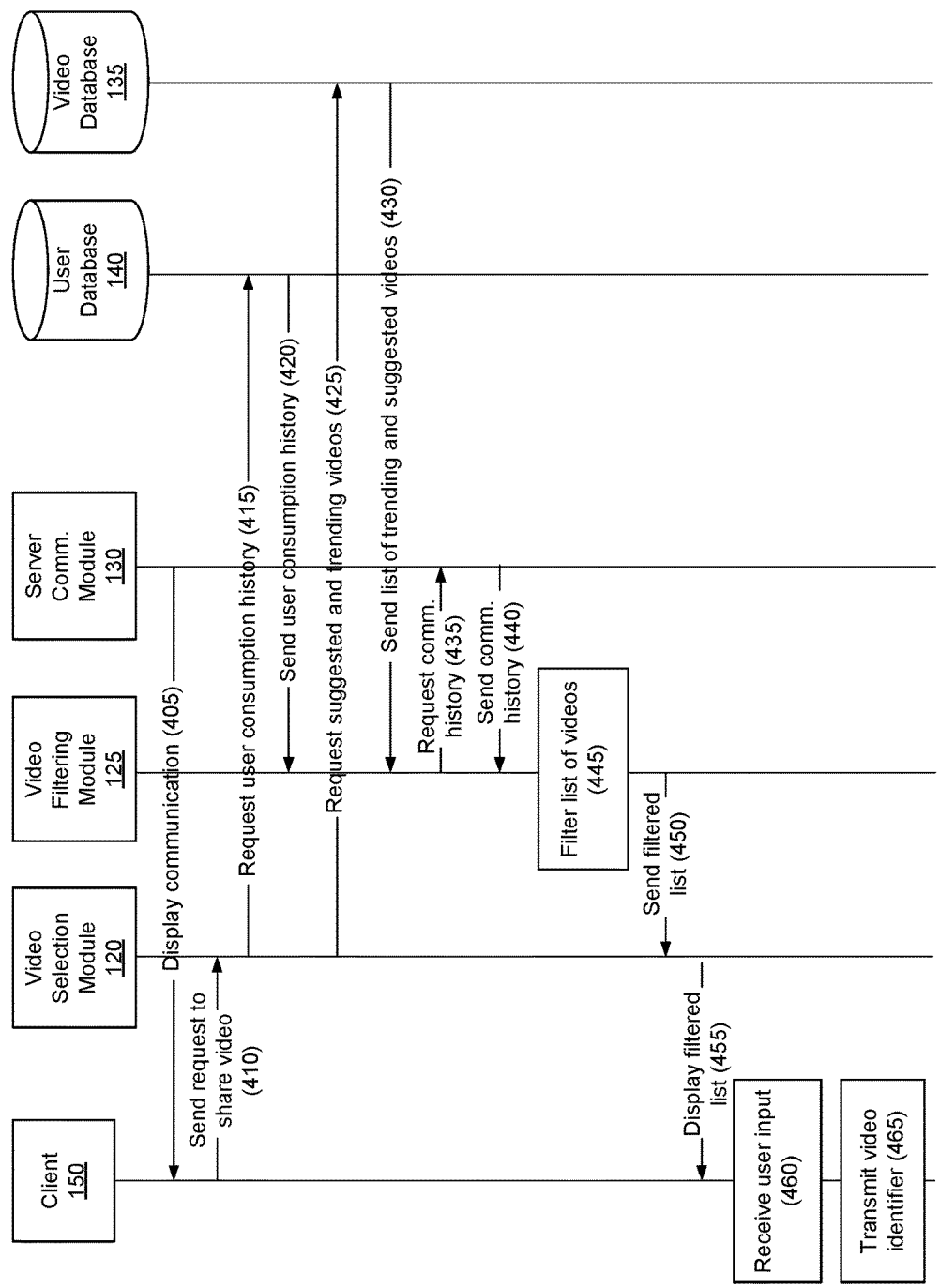
FIG. 4A is an interaction diagram illustrating a method for adding a video to a group communication, according to an embodiment.

FIG. 4 is an interaction diagram illustrating a method for adding a user-selected video to a group communication. The server communication module 130 displays 405 a group communication to the client 150 through the client communication module 165 of the content sharing application 160. At 410, the user provides input comprising a request to share a video though the video sharing module 170. In one embodiment, the user input comprises selection of a video sharing GUI element such as an icon or button displayed in the user interface of the group communication. Responsive to receiving the user input, the video selection module 120 queries 415 the user database 140 for identifier(s) of video(s) having playback associated with the user, as discussed above. At 420, the user database 140 sends the user consumption history to the video filtering module 125 for filtering.

The video selection module 120 also queries 425 the video database 135 for trending or suggested videos, as determined by the content sharing service 100. The video database 135 retrieves video identifiers of the trending or suggested videos and sends 430 the video identifiers to the video filtering module 125. At 435, the video filtering module 125 queries the server communication module 130 for the group communication history and at 440, the server communication module 130 sends the group communication history to the video filtering module 125.

The video filtering module 125 filters 445 the identifiers of trending or suggested videos as well as the identifiers of videos from the user's consumption history based on filtering criteria, as discussed above. The video filtering module 125 removes pre-roll advertisements and videos that are not shareable by the user (i.e., videos that none of the participants in the group communication have permission to access). The video filtering module 125 also filters out videos that have already been shared in the group communication.

After filtering the received videos, the video filtering module 125 sends 450 the identifiers of the filtered videos to the video selection module 120 for display to the user. The video selection module 120 displays 455 thumbnails representing the videos (e.g., in a list format) on the video selection interface through the video sharing module 170. At 460, the client communication module 165 on the client 150 receives user input indicating selection of one or more videos on the video selection interface. Responsive to receiving the user input, the video sharing module 170 displays a draft message including an identifier (e.g., previously presented identifier or a distribution identifier) of the selected one or more videos and offering the user to add a text message. When the user activates the send button of the video sharing module 170, the video sharing module 170 transmits 465 the identifier (e.g., previously presented identifier or distribution identifier) of the selected one or more videos along with the user's message to the client devices 150 of the users in the group communication. The client devices 150 associated with the users in the group communication use the received identifier to request the selected video from the video database 135.

Figure 4B:
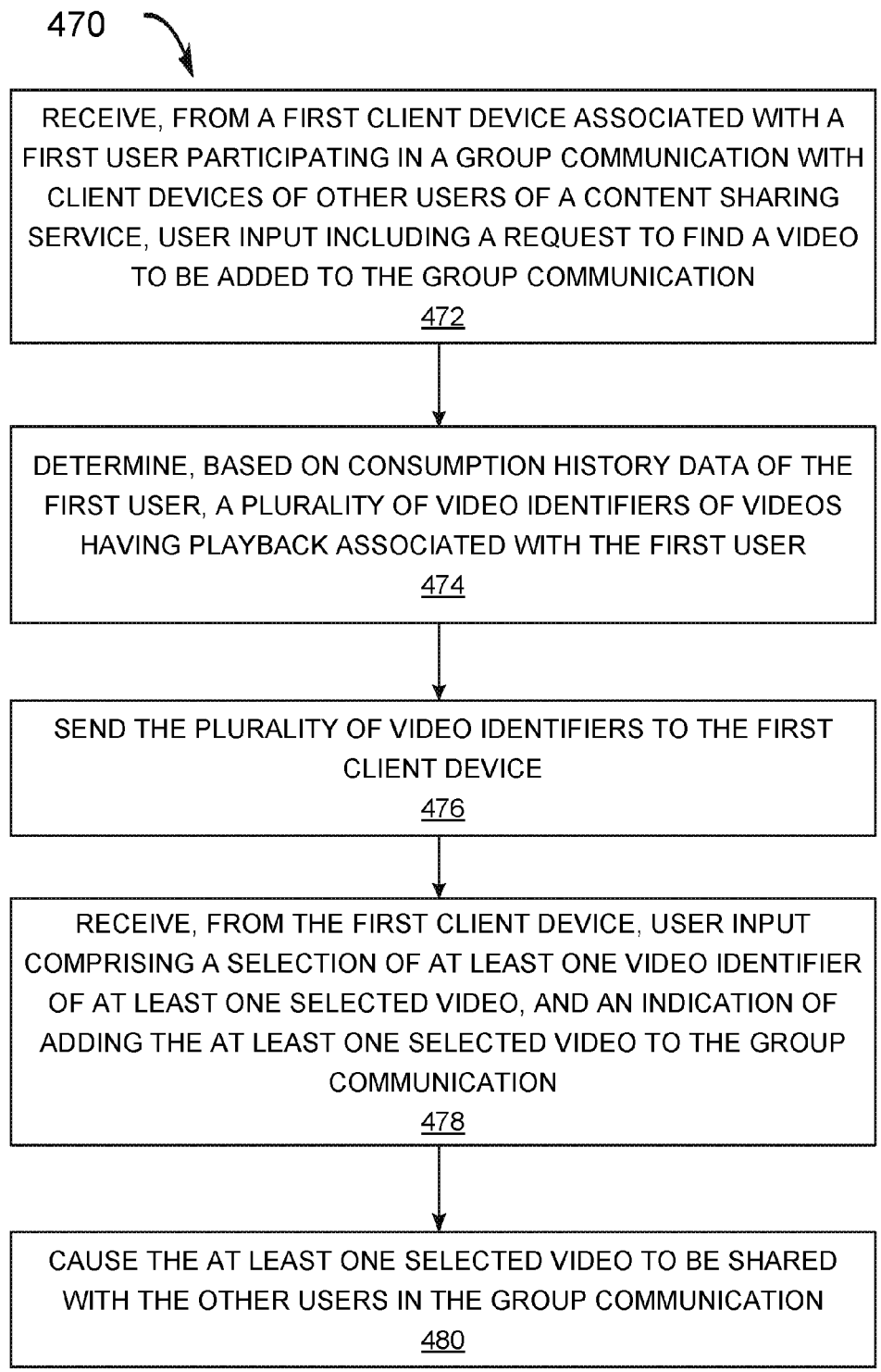
FIG. 4B is a flow diagram of an example server-side method for allowing a user to add a video from the user's consumption history to a group communication between the user and other participants, in accordance with some implementations of the present disclosure.

FIG. 4B is a flow diagram of an example server-side method 470 for allowing a user to add a video from the user's consumption history to a group communication between the user and other participants, in accordance with some implementations of the present disclosure. Method 470 and each of its individual functions, routines, subroutines, or operations may be performed by one or more processing devices of the computer device executing the method. In certain implementations, method 470 may be performed by a single processing thread. Alternatively, method 470 may be performed by two or more processing threads, each thread executing one or more individual functions, routines, subroutines, or operations of the method. In an illustrative example, the processing threads implementing method 470 may be synchronized (e.g., using semaphores, critical sections, and/or other thread synchronization mechanisms). Alternatively, the processes implementing method 470 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 470 may be performed by content sharing service 100 executed by one or more processing devices of the server(s) 110.

Method 470 may begin at block 472 when a processing device receives, from a first client device associated with a first user participating in a group communication with other users of a content sharing service, user input including a request to find a video to be added to the group communication. The user input may be a selection of a video sharing GUI element 255 in the GUI of FIG. 2.

At block 474, the processing device determines, based on consumption history data of the first user, video identifiers of videos having playback associated with the first user. Such videos may be videos watched, liked, commented on, etc. by the first user. As discussed above, these videos may also include trending and/or suggested videos, and the resulting collection of videos can be filtered out based on permissions of users in the group and/or based on previous video postings to the group communication. At block 476, the processing device sends the resulting video identifiers to the first client device.

At block 478, the processing device receives, from the first client device, user input comprising a selection of at least one video identifier of at least one selected video, and an indication of adding the at least one selected video to the group communication. In one implementation, the operation of block 478 is performed in response to the application 160 receiving the user selection of at least one identifier of at least one video presented in the video selection GUI of FIG. 3, presenting the at least one selected video identifier in the GUI of FIG. 2, and receiving a user request to share the video with other participants of the group communication (e.g., upon the user's activating the Send button). In another implementation, the operation of block 478 involves receiving the at least one selected identifier of the at least one selected video presented in the video selection GUI of FIG. 3, providing at least one distribution identifier corresponding to the at least one selected video identifier to the first client device, and receiving the indication of adding the at least one selected video to the group communication when the application 160 presents the at least one distribution identifier of the at least one selected video in the GUI of FIG. 2, and the user submits a request to share the video with other participants of the group communication (e.g., upon the user's activating the Send button).

At block 480, processing device causes the at least one selected video to be shared with the other users in the group communication. In some implementation, this can involve transmitting, to the client devices of the other users, the at least one video identifier of the at least one selected video or the at least one distribution identifier of the at least one selected video. When a distribution identifier is used, the processing device may also transmit, to the first client device, the at least one distribution identifier of the at least one selected video, as discussed above.

Figure 4C:
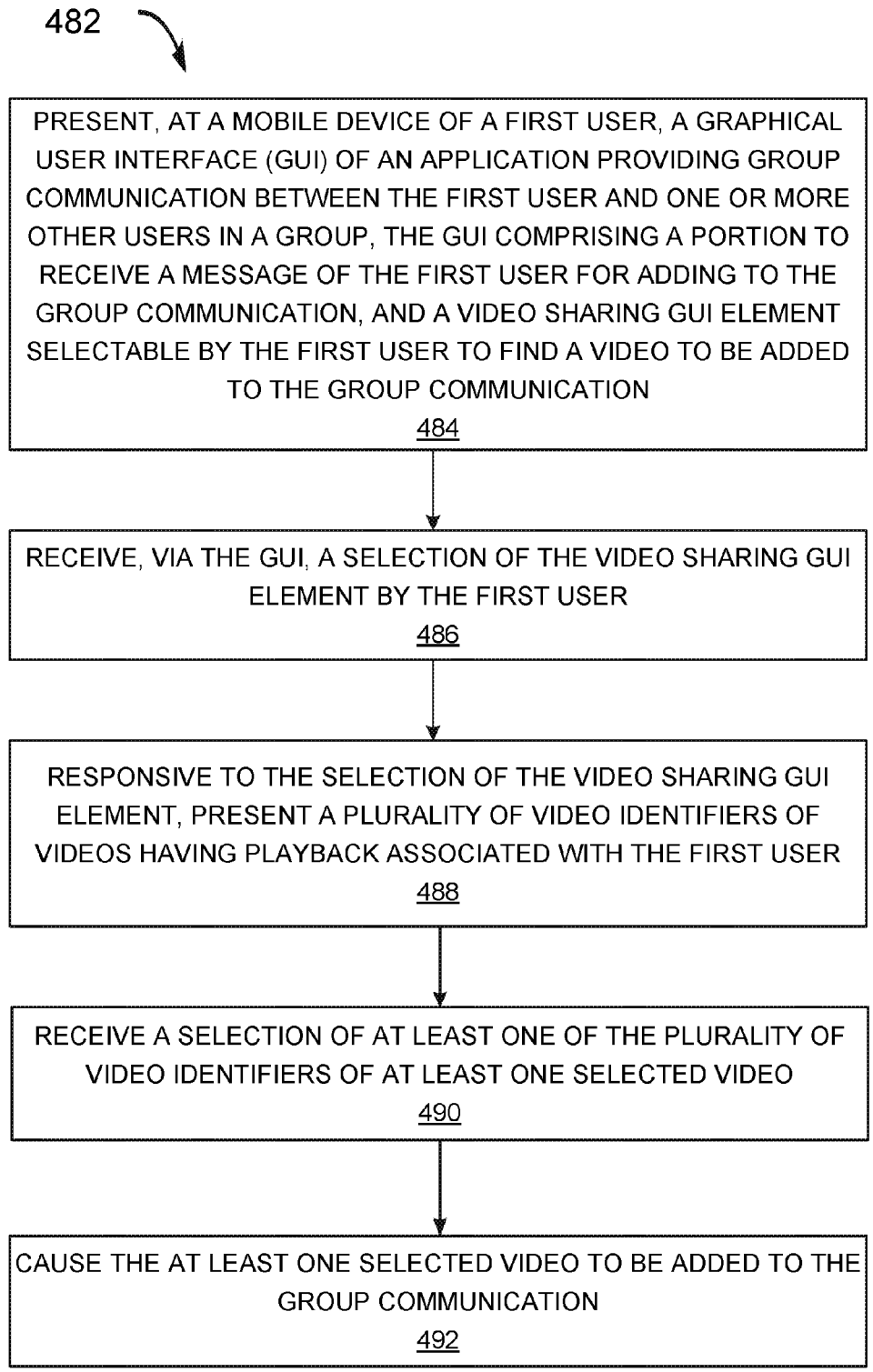
FIG. 4C is a flow diagram of an example client-side method for allowing a user to add a video from the user's consumption history to a group communication between the user and other participants, in accordance with some implementations of the present disclosure.

FIG. 4C is a flow diagram of an example client-side method 482 for allowing a user to add a video from the user's consumption history to a group communication between the user and other participants, in accordance with some implementations of the present disclosure. Method 482 and each of its individual functions, routines, subroutines, or operations may be performed by one or more processing devices of the computer device executing the method. In certain implementations, method 482 may be performed by a single processing thread. Alternatively, method 482 may be performed by two or more processing threads, each thread executing one or more individual functions, routines, subroutines, or operations of the method. In an illustrative example, the processing threads implementing method 482 may be synchronized (e.g., using semaphores, critical sections, and/or other thread synchronization mechanisms). Alternatively, the processes implementing method 482 may be executed asynchronously with respect to each other. In one implementation, method 482 may be performed by application 160 executed by one or more processing devices of a mobile device (client device 150).

Method 482 may begin at block 482 by a processing device presenting, at a mobile device of a first user, a GUI of application 160 providing group communication between the first user and one or more other users in a group. The GUI includes a portion to receive a message of the first user for adding to the group communication, and a video sharing GUI element (e.g., control 255) selectable by the first user to find a video to be added to the group communication.

At block 486, the processing device receives, via the GUI, a selection of the video sharing GUI element (control 255) by the first user. At block 488, responsive to the selection of the video sharing GUI element, the processing device presents video identifiers of videos having playback associated with the first user. As discussed above, the video identifiers can be selected by the server based on the first user's consumption history and can be identifiers of videos that were watched, liked, commented on, etc. by the first user. As discussed above, these videos may also include trending and/or suggested videos, and the resulting collection of videos can be filtered out based on permissions of users in the group and/or based on previous video postings to the group communication. At block 490, the processing device receives a selection of at least one of the plurality of video identifiers of at least one selected video.

At block 492, the processing device causes the at least one selected video to be added to the group communication. In some implementations, the operation of block 492 involves presenting, responsive to the selection of the at least one video identifier of the at least one selected video, the at least one video identifier of the at least one selected video or at least one distribution identifier of the at least one selected video. The presentation can be in the portion of the GUI that displays the thread of messages. Upon receiving a user request to share the at least one selected video with the one or more other users (when the first user activates the send button), the processing device transmits, to the server, an indication of sharing the at least one selected video with the one or more other users. In response, the server transmits, to mobile devices of the other users, the at least one video identifier of the at least one selected video or the at least one distribution identifier of the at least one selected video for presentation in the group communication.

Figure 5:
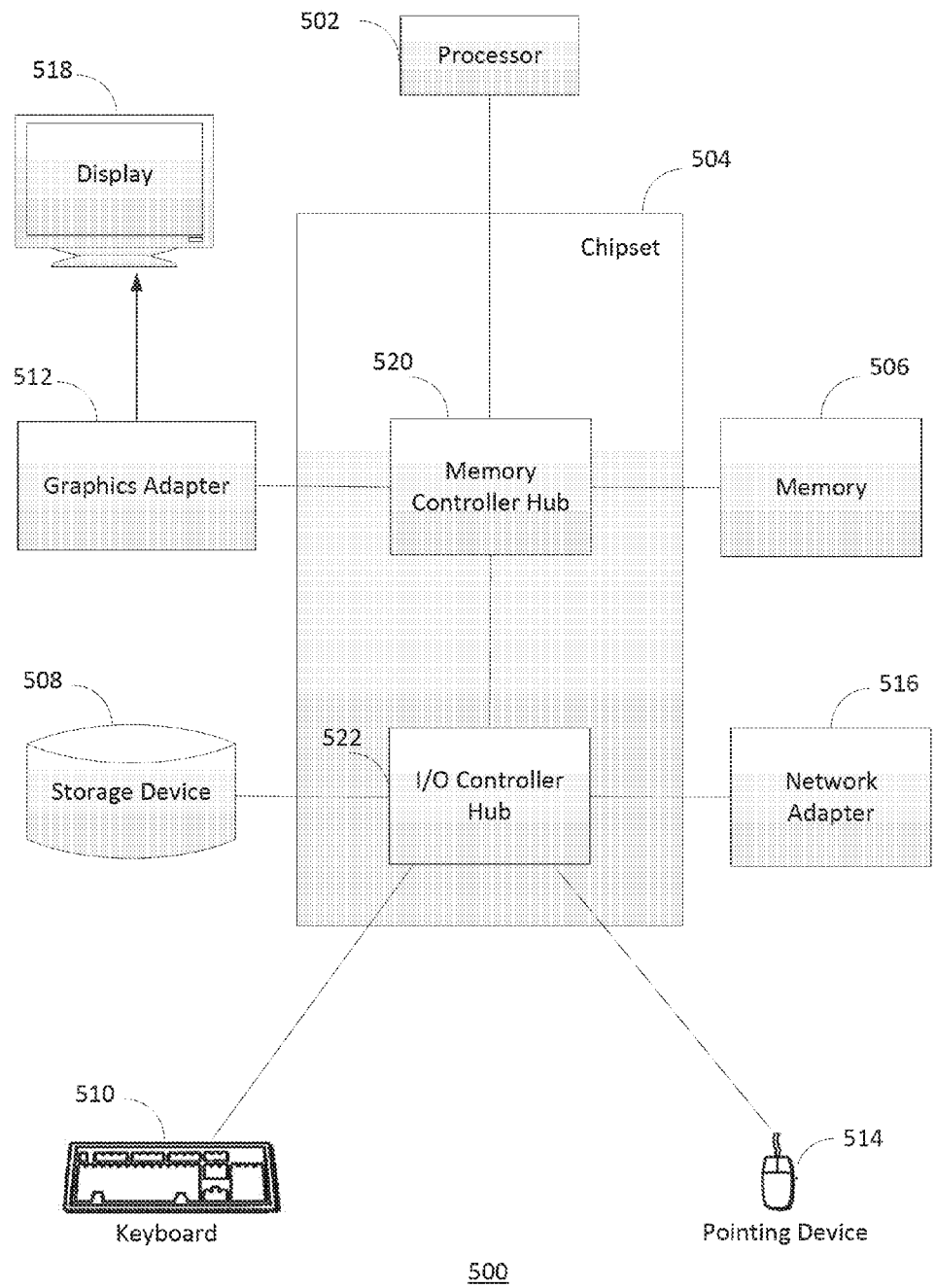
FIG. 5 is a block diagram illustrating an example computer usable to implement entities of the video-sharing environment, according to an embodiment.

The client 150 and the content sharing service 100 are each implemented using computers. FIG. 5 is a block diagram illustrating an example computer 500 usable to implement entities of the video-sharing environment, in accordance with one embodiment. The example computer 500 has sufficient memory, processing capability, network connectivity bandwidth, and other computing resources to implement the selection and insertion of user-selected videos into a group communication as described herein.

The computer 500 includes at least one processor 502 (e.g., a central processing unit, a graphics processing unit) coupled to a chipset 504. The chipset 504 includes a memory controller hub 520 and an input/output (I/O) controller hub 522. A memory 506 and a graphics adapter 512 are coupled to the memory controller hub 520, and a display 518 is coupled to the graphics adapter 512. A storage device 508, a keyboard 510, a pointing device 514, and a network adapter 516 are coupled to the I/O controller hub 522. Other embodiments of the computer 500 have different architectures.

The storage device 508 is a non-transitory computer-readable storage medium such as a hard drive, compact disk read-only memory (CD-ROM), digital versatile disc (DVD), or a solid-state memory device. The memory 506 holds instructions and data used by the processor 502. The processor 502 can include one or more processors 502 having one or more cores that execute instructions. The pointing device 514 is a mouse, touch-sensitive screen, or other type of pointing device, and in some instances is used in combination with the keyboard 510 to input data into the computer 500. The graphics adapter 512 displays media and other images and information on the display 518. The network adapter 516 couples the computer 500 to one or more computer networks (e.g., the network 180).

The computer 500 is adapted to execute computer program modules for providing the functionality described herein including presenting media and/or metadata generation. As used herein, the term "module" refers to computer program logic used to provide the specified functionality. Thus, a module can be implemented in hardware, firmware, and/or software. In one embodiment of a computer 500 that implements the content sharing service 100, program modules such as the video service module 115, the video selection module 120, the video filtering module 125, and the server communication module 130 are stored on the storage device 508, loaded into the memory 506, and executed by the processor 502.

The types of computers 500 used by the entities of the video-sharing environment can vary depending on the embodiment and the processing power required by the entity. For example, the client 150 is a smart phone, tablet, laptop, or desktop computer. As another example, the content sharing service 100 might comprise multiple blade servers working together to provide the functionality described herein. The computers 500 can contain duplicates of some components or can lack some of the components described above (e.g., a keyboard 510, a graphics adapter 512, a pointing device 514, a display 518). For example, the content sharing service 100 can run in a single computer 500 or multiple computers 500 communicating with each other through a network such as a server farm.

Aspects of the present disclosure have been described in particular detail with respect to various embodiments, and those of skill in the art will appreciate that the disclosure can be practiced in other embodiments. In addition, those of skill in the art will appreciate the following aspects of the disclosure. First, the particular naming of the components, capitalization of terms, the attributes, data structures, or any other programming or structural aspect is not mandatory or significant, and the mechanisms to implement the disclosure or its features can have different names, formats, or protocols. Second, the system can be implemented via a combination of hardware and software, as described, or entirely in hardware elements. Third, the particular division of functionality between the various system components described herein is merely exemplary, and not mandatory; functions performed by a single system component can instead by performed by multiple components, and functions performed by multiple components can instead be performed by a single component.

Some portions of this description describe the aspects of the disclosure in terms of algorithms and symbolic representations of operations on information. These algorithmic descriptions and representations are commonly used by those skilled in the art to convey the substance of their work effectively to others skilled in the art. These operations while described functionally computationally or logically are understood to be implemented by computer programs or equivalent electrical circuits microcode or the like. Furthermore it has also proven convenient at times to refer to these arrangements of operations as modules without loss of generality. The described operations and their associated modules can be embodied in software stored on a non-transitory computer-readable medium that cause a processor to execute described functions; or in firmware; or hardware; or any combinations thereof.

Embodiments can also relate to an apparatus for performing the operations herein. This apparatus can be specially constructed for the required purposes and/or it can comprise a general-purpose computing device selectively activated or reconfigured by a computer program stored in the computer. As noted, such a computer program can be stored in a non-transitory tangible computer readable storage medium or any type of media suitable for storing electronic instructions which can be coupled to a computer system bus. Furthermore any computing systems referred to in the specification can include a single processor or can be architectures employing multiple processor designs for increased computing capability. A general-purpose computer programmed as described above thereby becomes a special-purpose computer, adapted to perform the functions described here.

Aspects of the disclosure can also relate to a product that is produced by a computing process described herein. Such a product can comprise information resulting from a computing process where the information is stored on a non-transitory tangible computer readable storage medium and can include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description but rather by any claims that issue on an application based hereon.

What is claimed is:

1. A computer-implemented method comprising:
    receiving an indication of a request of a first user of a plurality of users of a content sharing service to find a video to be added to a group communication user interface (UI) as a message from the first user to other users of the plurality of users participating in a group communication,
        wherein the request of the first user is provided via a UI control in the group communication UI,
        wherein the group communication represents an exchange of messages between the plurality of users, and
        wherein the exchanged messages are visible to the plurality of users in the group communication UI as an ordered stream of posts;
    responsive to the receiving of the indication: (i) determining, based on consumption history data of the first user, a plurality of video identifiers of videos having playback associated with the first user; and (ii) sending the plurality of video identifiers to a first client device of the first user;
    receiving, from the first client device, user input comprising a selection of at least one video identifier of at least one selected video, and an indication of adding the at least one selected video to the group communication UI, the plurality of video identifiers comprising the at least one selected video identifier; and
    causing the at least one selected video to be shared with the other users in the group communication via a presentation of the at least one selected video as a message in the group communication UI.

2. The computer-implemented method of claim 1 wherein causing the at least one selected video to be shared with the other users in the group communication comprises:
    transmitting, to client devices of the other users, the at least one video identifier of the at least one selected video or at least one distribution identifier of the at least one selected video.

3. The computer-implemented method of claim 2 wherein causing the at least one selected video to be shared with the other users in the group communication comprises:
    transmitting, to the first client device, the at least one distribution identifier of the at least one selected video.

4. The computer-implemented method of claim 1, further comprising filtering the plurality of video identifiers to remove videos that are not shareable in the group communication.

5. The computer-implemented method of claim 1, further comprising filtering the plurality of video identifiers to remove videos that have already been added to the group communication.

6. The computer-implemented method of claim 1, further comprising:
    querying a video data store for identifiers of trending or suggested videos;
    determining a group communication history; and
    filtering the identifiers of trending or suggested videos to remove videos that are not shareable in the group communication.

7. The computer-implemented method of claim 1, further comprising:
    receiving user input comprising search parameters for a video;
    identifying search suggestions and search results responsive to the user input; and
    sending the search suggestions and search results to the first client device.

8. A computer-implemented method comprising:
    presenting, at a mobile device of a first user of a plurality of users participating in a group communication, a group communication graphical user interface (GUI) of an application providing the group communication between the first user and one or more other users of the plurality of participating users, the group communication GUI comprising a portion to receive a message of the first user for adding to the group communication, and a video sharing GUI element selectable by the first user to find a video to be added to the group communication as a message from the first user to the other users, wherein the group communication represents an exchange of messages between the plurality of participating users and wherein the exchanged messages are visible to the plurality of participating users in the group communication GUI as an ordered stream of posts;

receiving, via the group communication GUI, a selection of the video sharing GUI element by the first user;

responsive to the selection of the video sharing GUI element, automatically initiating a presentation, on the mobile device of the first user, of a plurality of video identifiers of videos having playback associated with the first user, the plurality of video identifiers being determined and provided, by a server, based on consumption history data of the first user; and responsive to a selection of at least one of the plurality of video identifiers of at least one selected video, causing the at least one selected video to be added to the group communication via a presentation of the at least one selected video as a message in the group communication GUI.

9. The computer-implemented method of claim 8 wherein causing the at least one selected video to be added to the group communication comprises:

receiving user input comprising the selection of the at least one video identifier of the at least one selected video;

presenting, in the portion of the group communication GUI on the mobile device of the first user, the at least one video identifier of the at least one selected video or at least one distribution identifier of the at least one selected video; and upon receiving a user request to share the at least one selected video with the one or more other users, transmitting, to a server, an indication of sharing the at least one selected video with the one or more other users, wherein the server is to transmit, to mobile devices of the one or more other users, the at least one video identifier of the at least one selected video or the at least one distribution identifier of the at least one selected video for presentation in the group communication GUI.

10. The computer-implemented method of claim 8, wherein the plurality of video identifiers excludes video identifiers of videos that are not shareable in the group communication.

11. The computer-implemented method of claim 8, wherein the plurality of video identifiers excludes video identifiers of videos that have already been added to the group communication.

12. The computer-implemented method of claim 8, wherein the plurality of video identifiers are presented in a second GUI, the second GUI comprising a search GUI element to receive user input of one or more search parameters for a video.

13. The computer-implemented method of claim 12, wherein a subset of the plurality of video identifiers presented in the second GUI comprises one or more video identifiers of one or more trending or suggested videos that have not been previously watched by the first user, and wherein the second GUI includes a recently watched indicator selectable by the first user to sort the plurality of video identifies based on watch time by the first user.

14. A non-transitory computer-readable medium storing computer-executable instructions that, in response to execution, cause a processor to perform operations, comprising:

receiving an indication of a request of a first user of a plurality of users of a content sharing service to find a video to be added to a group communication user interface (UI) as a message from the first user to other users of the plurality of users participating in a group communication, wherein the request of the first user is provided via a UI control in the group communication UI, wherein the group communication represents an exchange of messages between the plurality of users, and wherein the exchanged messages are visible to the plurality of users in the group communication UI as an ordered stream of posts;

responsive to the receiving of the indication: (i) determining, based on consumption history data of the first user, a plurality of video identifiers of videos having playback associated with the first user; and (ii) sending the plurality of video identifiers to the first client device;

receiving, from the first client device, user input comprising a selection of at least one video identifier of at least one selected video, and an indication of adding the at least one selected video to the group communication UI, the plurality of video identifiers comprising the at least one selected video identifier; and causing the at least one selected video to be shared with the other users in the group communication via a presentation of the at least one selected video as a message in the group communication UI.

15. A mobile device comprising;

a memory; and a processing device, coupled to the memory, to:

present a group communication graphical user interface (GUI) of an application providing group communication between a first user and one or more other users of a plurality of users participating in the group communication, the group communication GUI comprising a portion to receive a message of the first user for adding to the group communication, and a video sharing GUI element selectable by the first user to find a video to be added to the group communication as a message from the first user to the other users, wherein the group communication represents an exchange of messages between the plurality of participating users and wherein the exchanged messages are visible to the plurality of participating users as an ordered stream of posts;

receive, via the group communication GUI, a selection of the video sharing GUI element by the first user;

responsive to the selection of the video sharing GUI element, automatically initiate a presentation of a plurality of video identifiers of videos having playback associated with the first user, the plurality of video identifiers being determined and provided, by a server, based on consumption history data of the first user; and responsive to a selection of at least one of the plurality of video identifiers of at least one selected video, cause the at least one selected video to be added to the group communication via a presentation of the at least one selected video as a message in the group communication GUI.

16. The mobile device of claim 15 wherein the videos having playback associated with the first user are specified in consumption history data of the first user, the consumption history data being collected by a server.

17. The mobile device of claim 15 wherein to cause the at least one selected video to be added to the group communication, the processing device is to:
  receive user input comprising the selection of the at least one video identifier of the at least one selected video;
  present, in the portion of the group communication GUI, the at least one video identifier of the at least one selected video or at least one distribution identifier of the at least one selected video; and
  upon receiving a user request to share the at least one selected video with the one or more other users, transmit, to a server, an indication of sharing the at least one selected video with the one or more other users, wherein the server is to transmit, to mobile devices of the one or more other users, the at least one video identifier of the at least one selected video or the at least one distribution identifier of the at least one selected video for presentation in the group communication GUI.

18. The mobile device of claim 15, wherein the plurality of video identifiers excludes video identifiers of videos that are not shareable in the group communication.

19. The mobile device of claim 15, wherein the plurality of video identifiers excludes video identifiers of videos that have already been added to the group communication.

* * * * *